(12) United States Patent
Weidig

(10) Patent No.: US 8,615,608 B2
(45) Date of Patent: Dec. 24, 2013

(54) PC MANAGED NETWORKED AUDIO BELL/INTERCOM SYSTEM

(76) Inventor: Terry Daniel Weidig, Austin, TX (US)

( * ) Notice: Subject to any disclaimer, the term of this patent is extended or adjusted under 35 U.S.C. 154(b) by 0 days.

(21) Appl. No.: 13/422,126

(22) Filed: Mar. 16, 2012

(65) Prior Publication Data

US 2012/0177188 A1    Jul. 12, 2012

Related U.S. Application Data

(63) Continuation-in-part of application No. 11/963,824, filed on Dec. 22, 2007, now Pat. No. 8,151,006, which is a continuation-in-part of application No. 10/974,445, filed on Oct. 27, 2004, now abandoned.

(51) Int. Cl.
| | |
|---|---|
| *G06F 3/00* | (2006.01) |
| *G06F 13/12* | (2006.01) |
| *G06F 15/16* | (2006.01) |
| *G06F 12/10* | (2006.01) |
| *G06F 9/44* | (2006.01) |
| *G06Q 10/10* | (2012.01) |

(52) U.S. Cl.
CPC .......... *G06F 12/1081* (2013.01); *G06F 9/4411* (2013.01); *G06Q 10/10* (2013.01)
USPC ......... 710/3; 710/8; 710/36; 710/62; 709/204

(58) Field of Classification Search
None
See application file for complete search history.

(56) References Cited

U.S. PATENT DOCUMENTS

| | | | |
|---|---|---|---|
| 2002/0053078 A1* | 5/2002 | Holtz et al. | 725/14 |
| 2004/0146047 A1* | 7/2004 | Turcan et al. | 370/352 |
| 2006/0095331 A1* | 5/2006 | O'Malley et al. | 705/22 |

* cited by examiner

*Primary Examiner* — Alan Chen
(74) *Attorney, Agent, or Firm* — Hulsey P.C.; William N. Hulsey, III; Jacob S. Mattis

(57) ABSTRACT

A method, storage medium, and system for a managed audio bell/intercom including a controller and audio devices connected by an industry standardized network, wherein the controller contains logic to distribute action via the network to the audio devices.

20 Claims, 28 Drawing Sheets

Fig. 6A

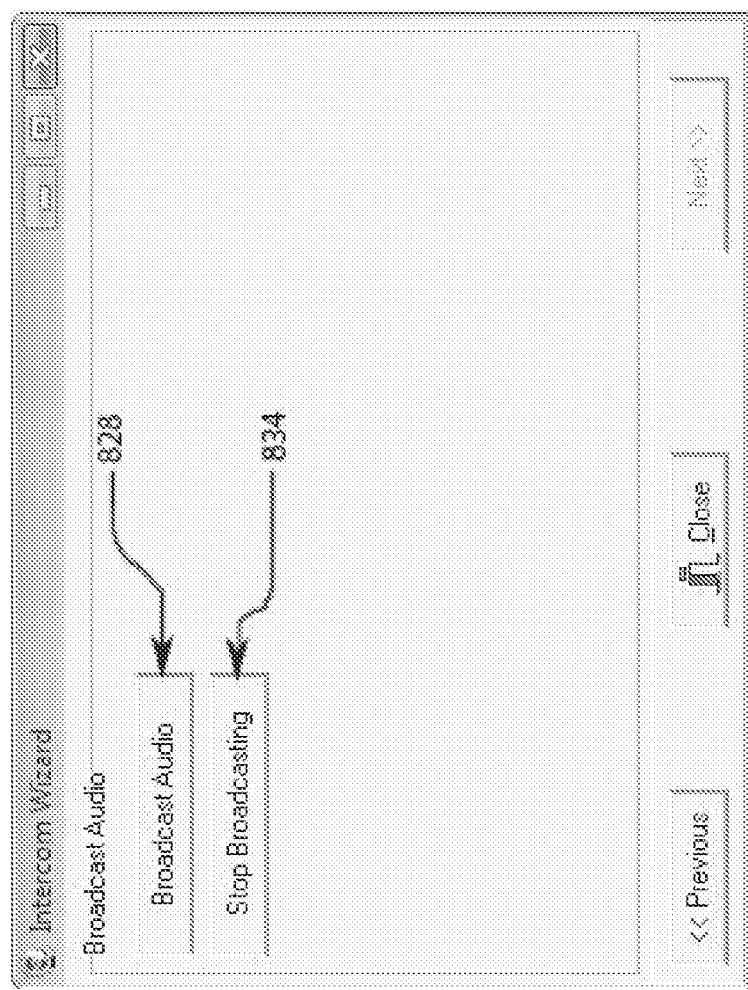

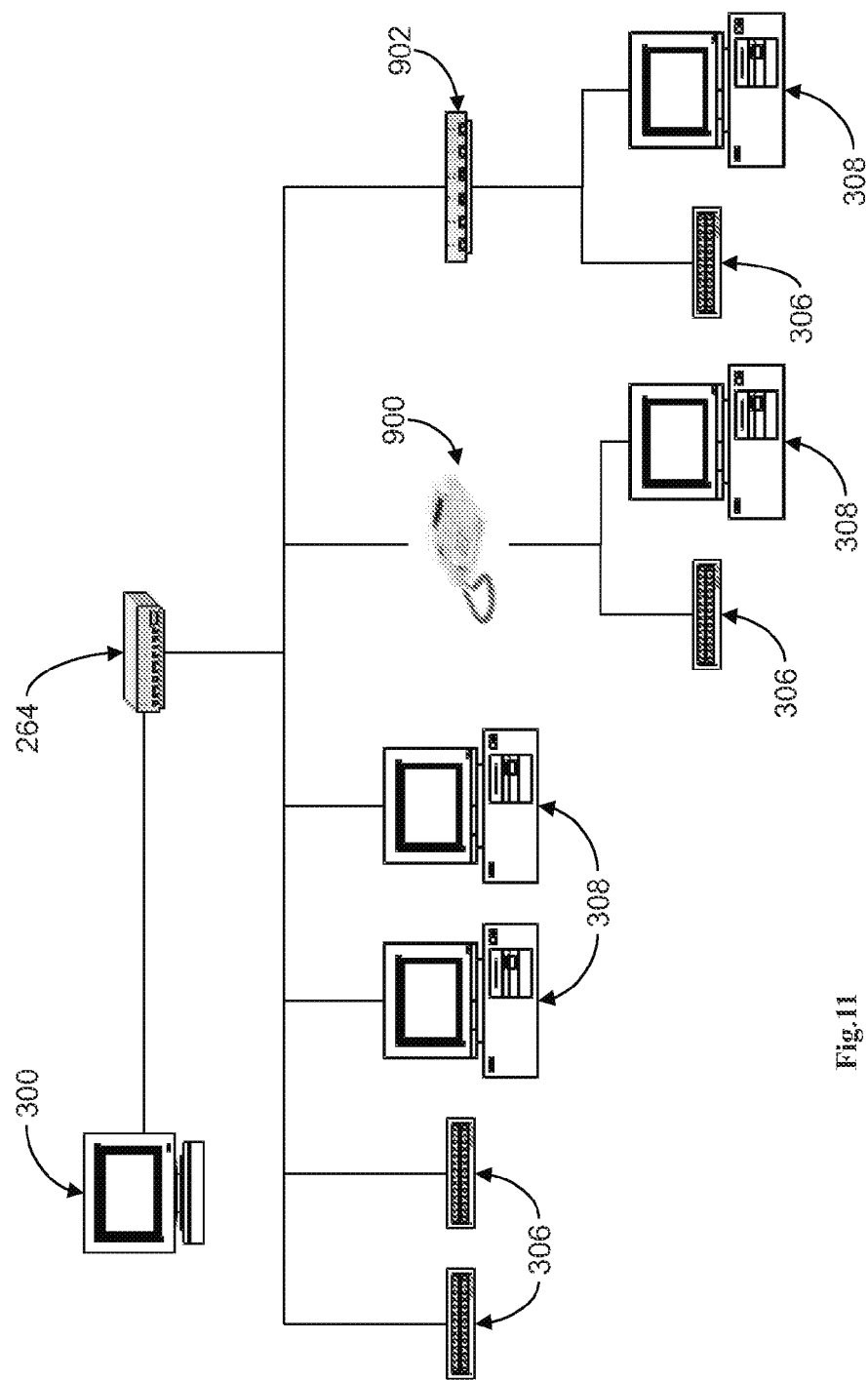

PC MANAGED NETWORKED AUDIO BELL/INTERCOM SYSTEM

CROSS-REFERENCE TO RELATED APPLICATION

This application is a continuation-in-part of U.S. patent application Ser. No. 11/963,824 filed on Dec. 22, 2007 which is a continuation-in-part of U.S. patent application Ser. No. 10/974,445 filed Oct. 27, 2004, of which both applications are incorporated herein by reference.

FIELD OF THE INVENTION

This invention relates to intercom/bell systems, specifically to such technologies to provide automation and control of audio across such systems.

BACKGROUND OF THE INVENTION

Known systems for providing scheduled zone audio for school bells, factory bells, and other applications require the use of proprietary devices and cabling. The most common existing systems use electronic timers to schedule the activation of relays at scheduled times. The timers activate a relay at scheduled times which completes a circuit and allows power to be sent through to electronic bell devices. There are several disadvantages to this solution. First, the electronic timers are very difficult to program and require a technician with special training to program the schedules. Second, the system only allows a single bell or tone sound to be played. Users cannot select different tones or bell sounds to signify different events, such as a class warning bell and a class tardy bell. In addition, since the bell circuits are hardwired, all devices on the circuit must play when triggered by the relay. There is no capability to trigger an individual device with the electronic time, unless a separate circuit is created for each bell device. Finally, the system requires a timer device in each location where bell circuits are located and the schedules must be maintained separately on each timer device. Different timers are likely to lose synchronization, so bell events that are intended to play at the same time on different timers may play at different times.

Another existing system uses a paging amplifier attached to an electronic timer and a chime device. The paging amplifier in this system includes contact closures that activate zones on the paging amplifier. The contact closures are wired through the electronic timer for each zone. When the electronic timer activates a relay, it completes the contact closure circuit which selects the zone on the paging amplifier. The chime device plays a selected sound according to how the chime device is wired. This system has similar disadvantages to the first system. The electronic timer requires a specialist to program the timer. The system can only play the selected chime sound from the chime device. In addition, all devices on the zone output of the amplifier must play audio when triggered by the timer. It is not possible to send audio to a specific speaker or audio device, unless a separate cable is ran to the amplifier for each device. The timer for each paging amplifier must also be programmed and maintained separately. This may also lead to timers becoming unsynchronized, which will result in bells playing at different times than expected.

BRIEF SUMMARY OF THE INVENTION

There is a need for a bell system that uses standard network architectures to communicate with bell components thus alleviating the dependence on proprietary networks.

There is a need for a bell system that allows different tones or bell sounds to be played to signify different types of events thus allowing certain sounds to convey additional meanings.

There is a need for a bell system that can be configured without extensive training, assistance, or expensive technicians.

There is a need for a bell system that allows bells and audio to be scheduled and targeted to specific locations thereby not requiring additional expensive and complicated wiring to create physical zone partitions.

There is a need for a bell system that allows synchronization of bells across multiple buildings thus alleviating the problem of bells sounding at different times when the intention was for the bells to sound in unison.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the accompanying claims.

BRIEF DESCRIPTIONS OF THE DRAWINGS

The novel features believed characteristic of the invention are set forth in the claims. The invention itself, however, as well as a preferred mode of use, further objectives, and advantages thereof, will best be understood by reference to the following detailed description of an illustrative embodiment when read in conjunction with the accompanying drawings, wherein:

Figure 3:
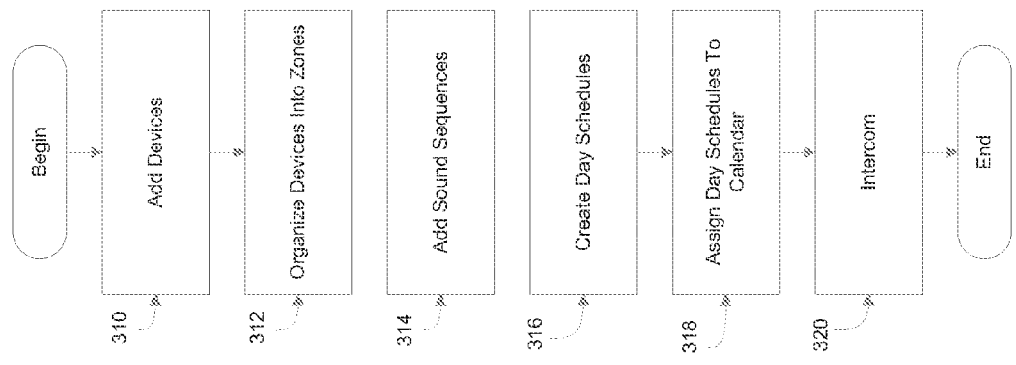
Figure 3A:
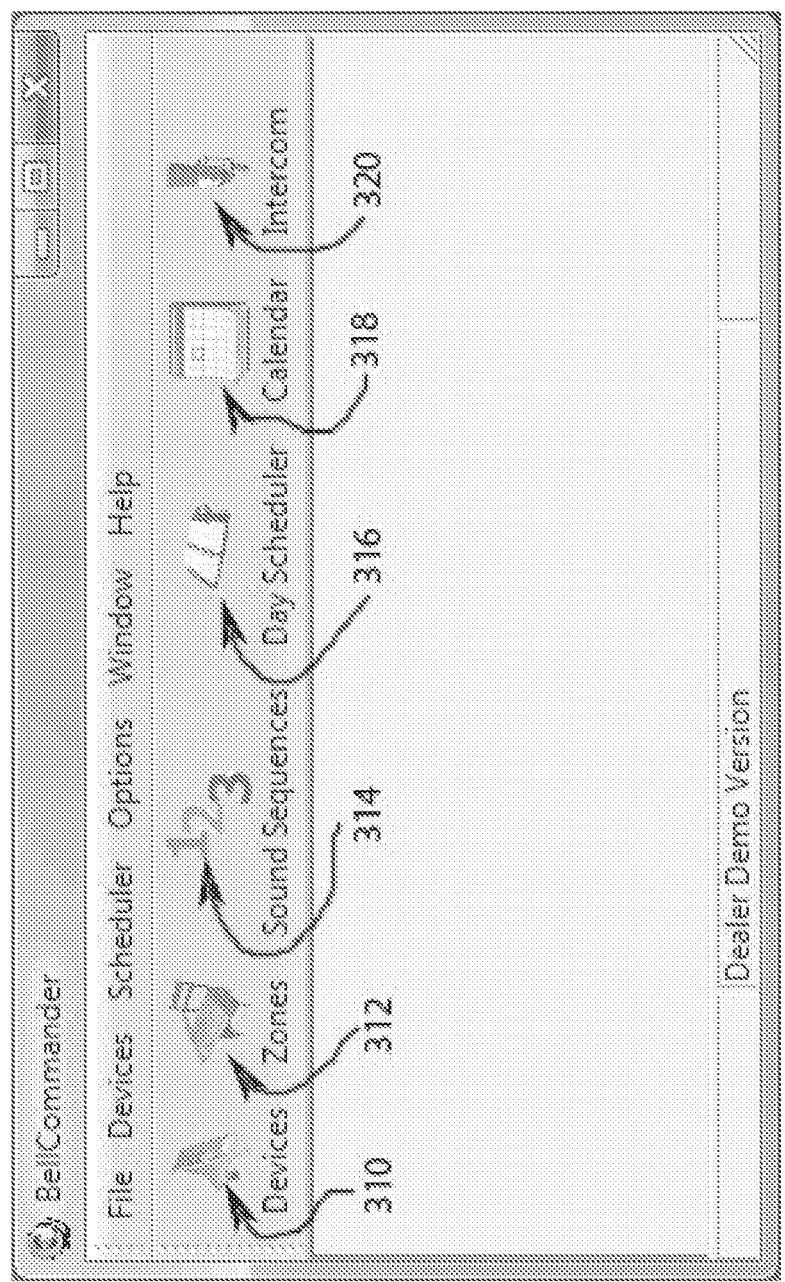

FIGS. 3 and 3A, respectively, show a flow chart and a graphical representation of the top-level user interface for creating a multiple zone bell schedule of the present embodiment.

Figure 4:
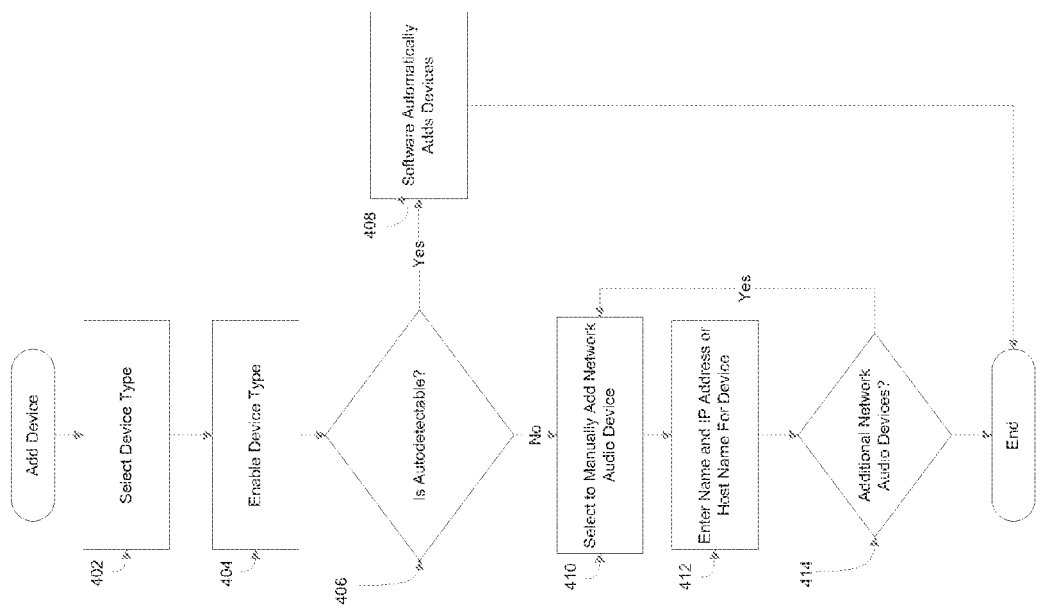

FIG. 4 shows a flow chart of the add network audio devices 310 option of the present embodiment.

Figure 4A:
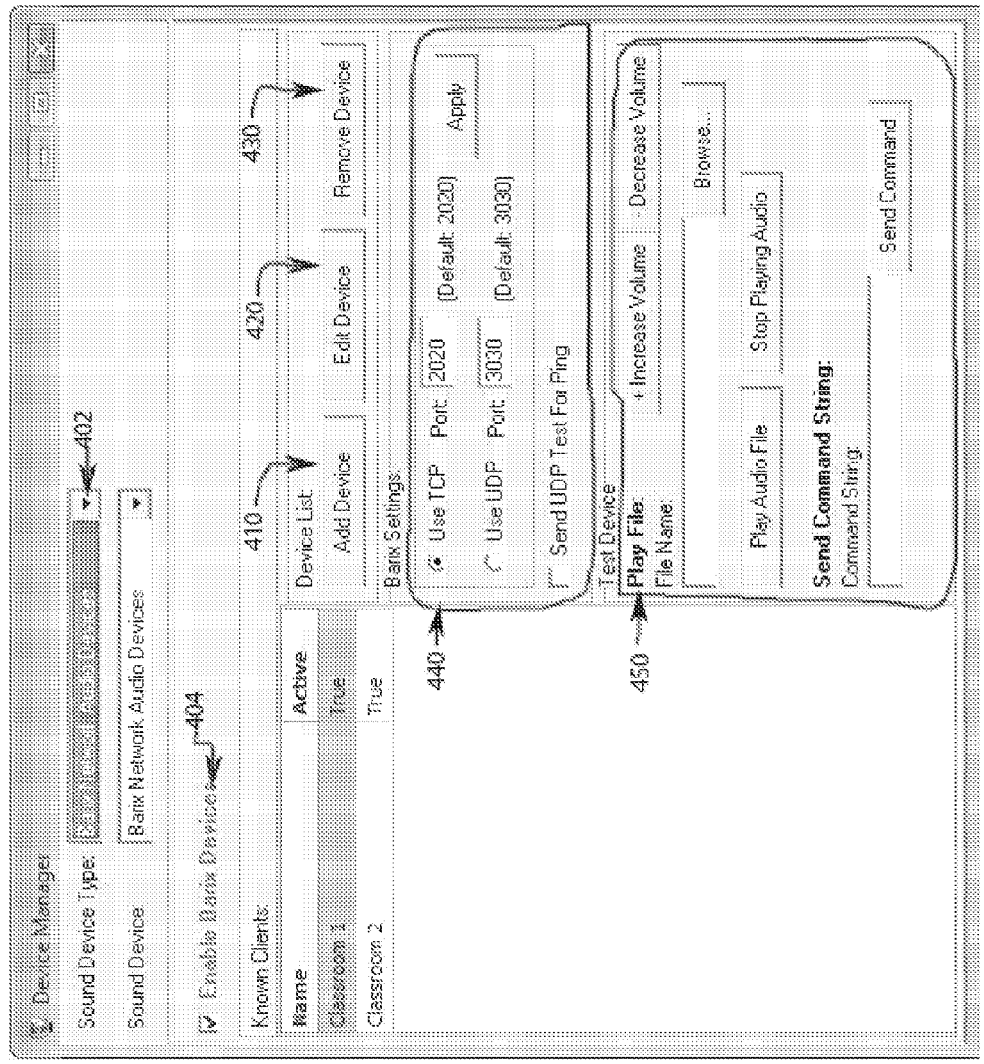
Figure 4B:
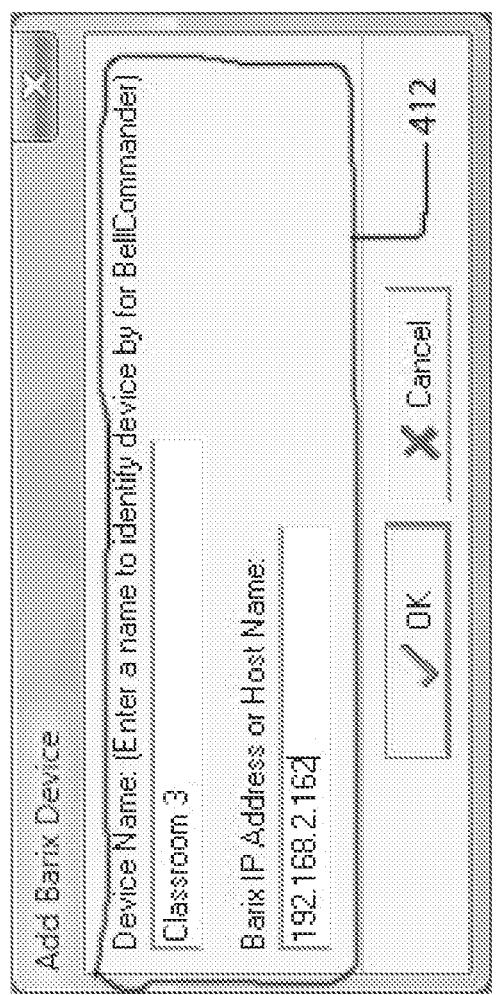

FIGS. 4A and 4B show graphical representations of the add network audio devices option of the present embodiment.

Figure 5:
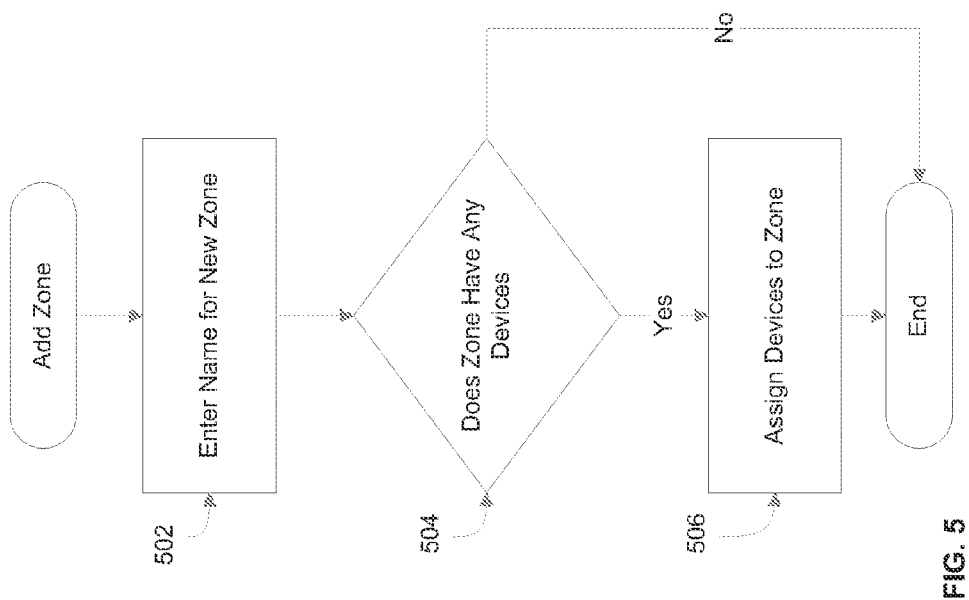

FIG. 5 shows a flow chart of the add zone option of the present embodiment.

Figure 5A:
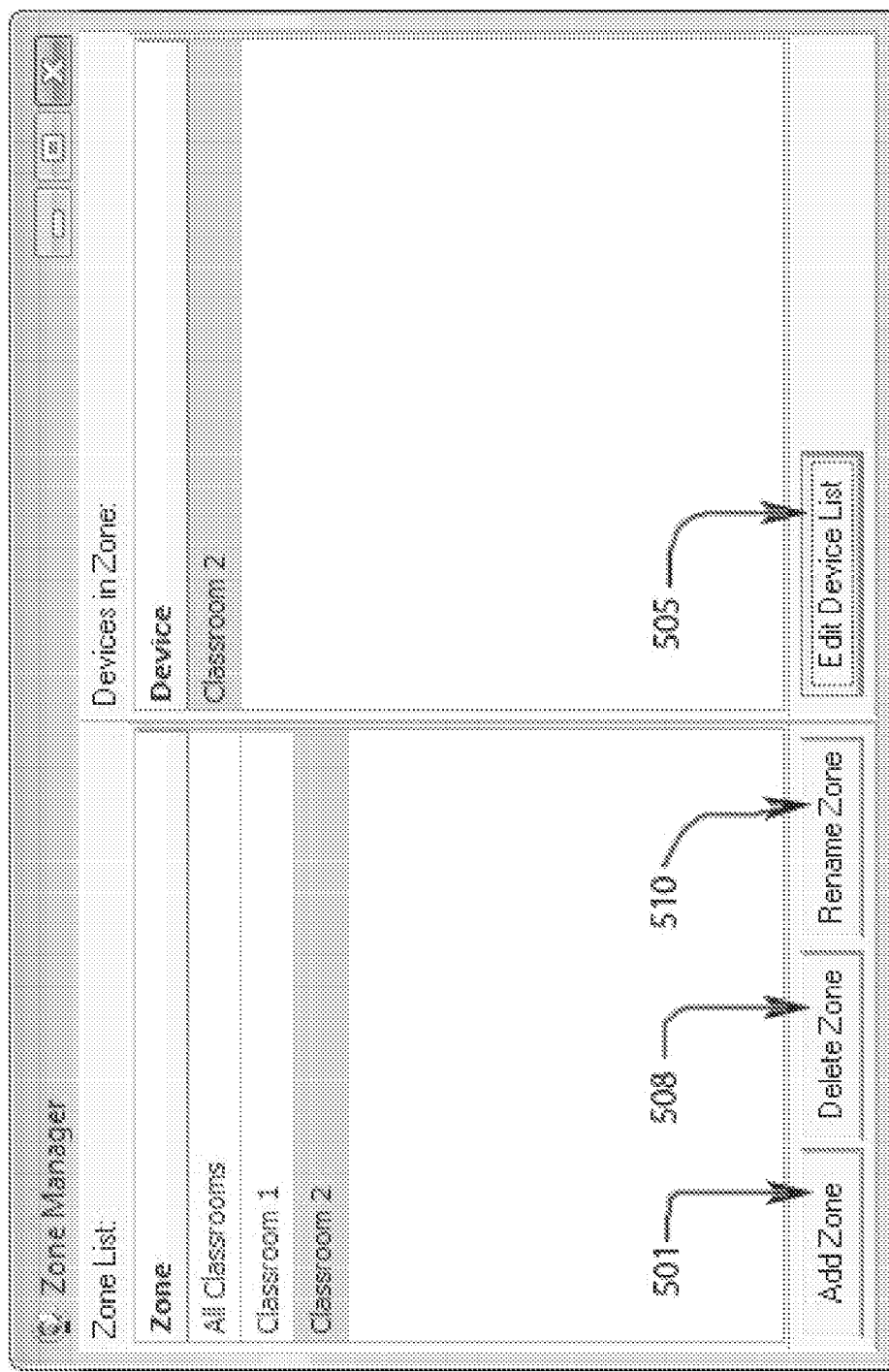
Figure 5B:
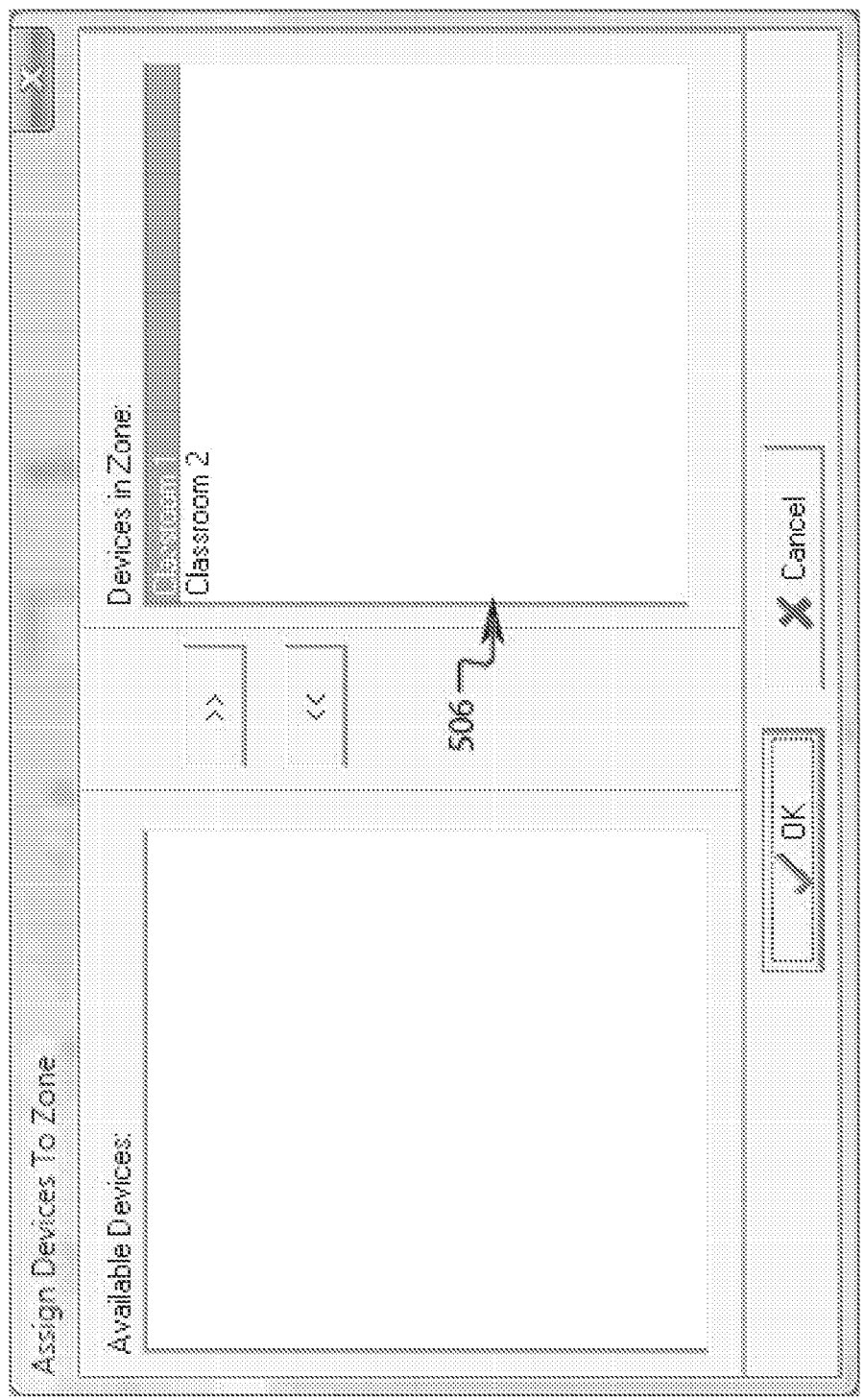

FIGS. 5A and 5B show graphical representations of the add zone option of the present embodiment.

Figure 6:
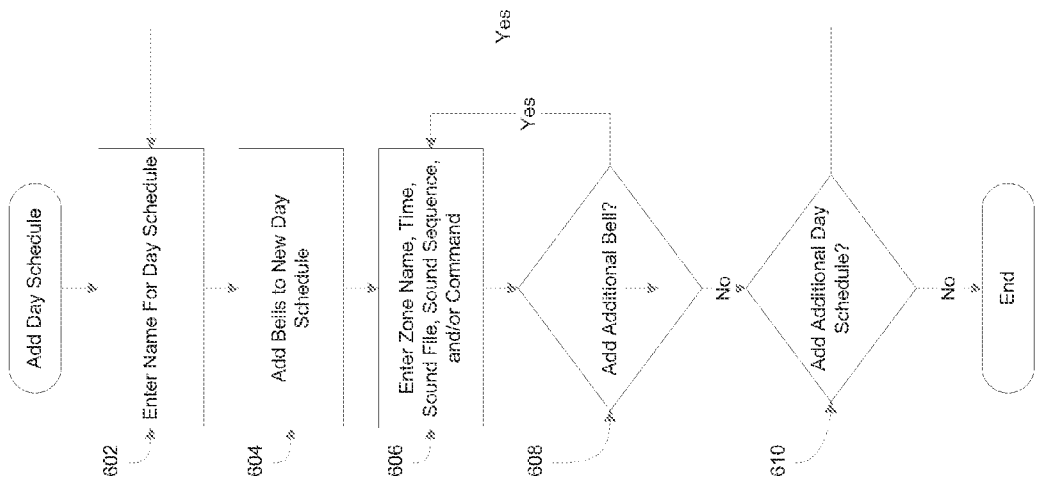

FIG. 6 shows a flow chart of the add a day schedule process of the present embodiment.

Figure 6A:
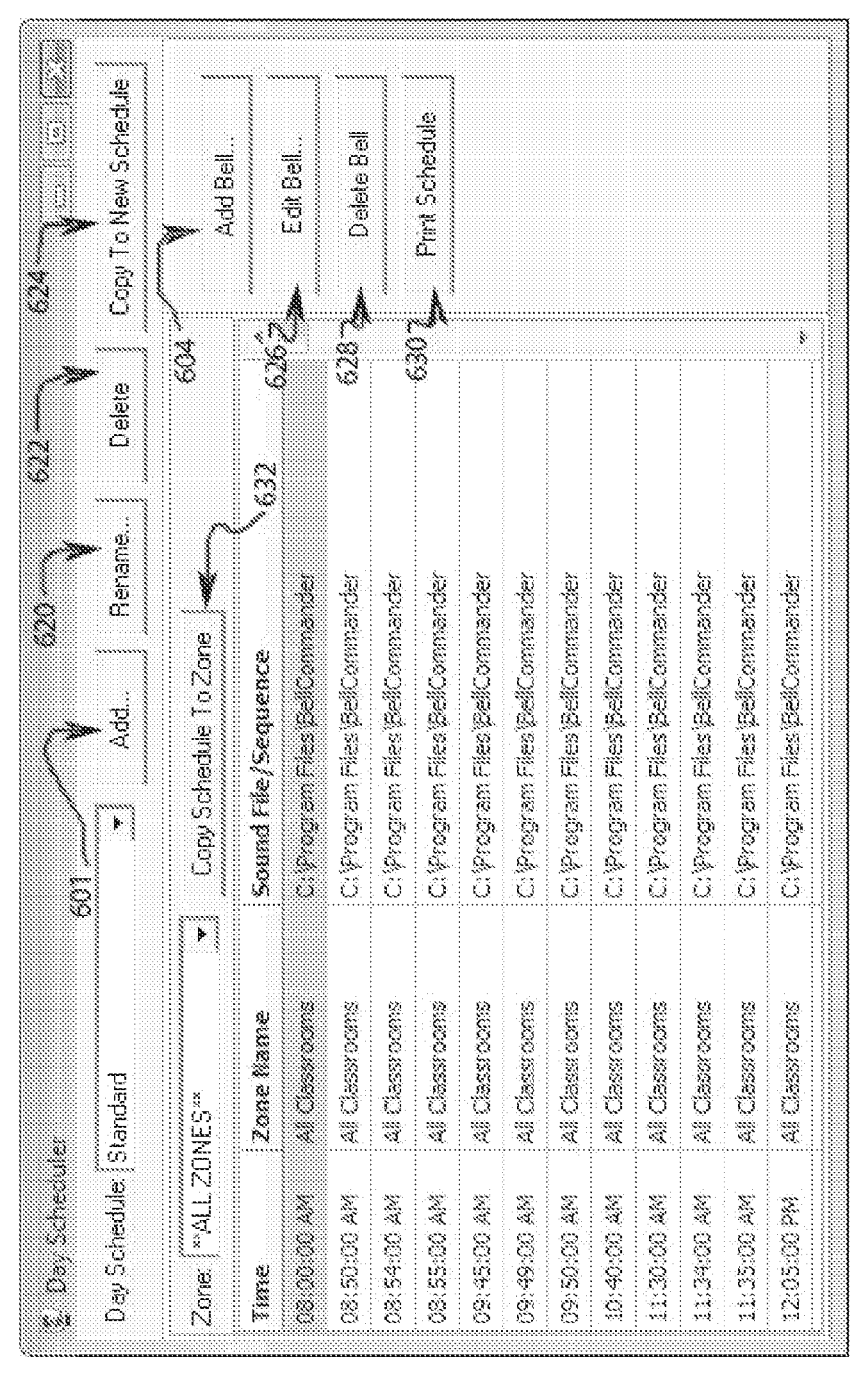
Figure 6B:
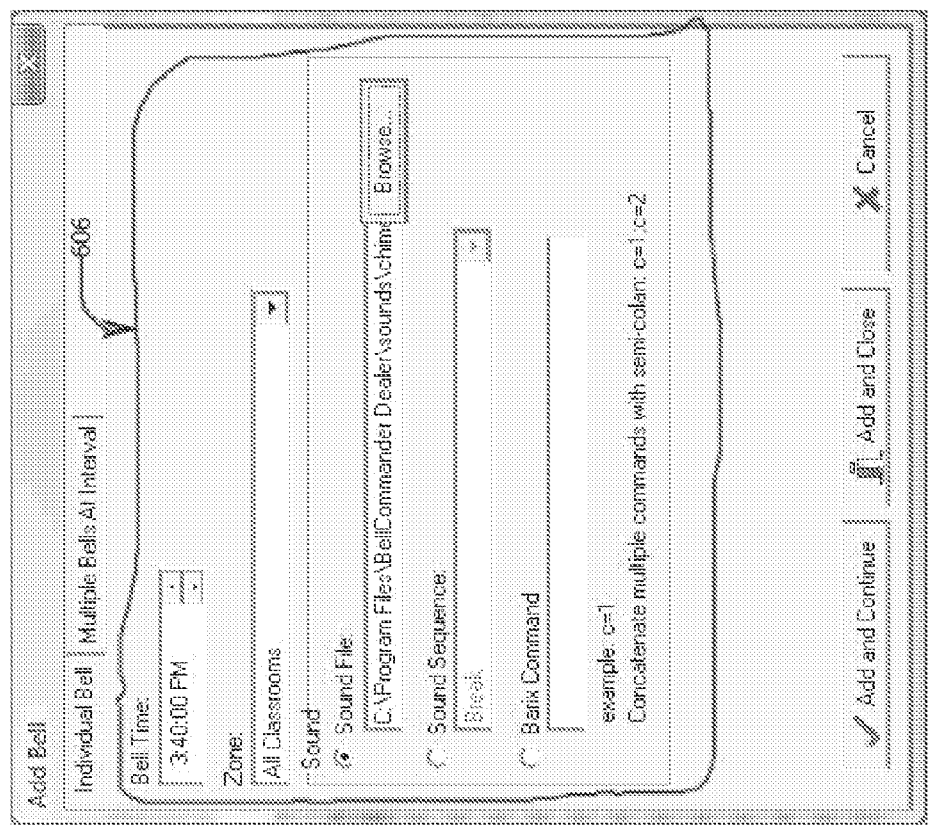
Figure 6C:
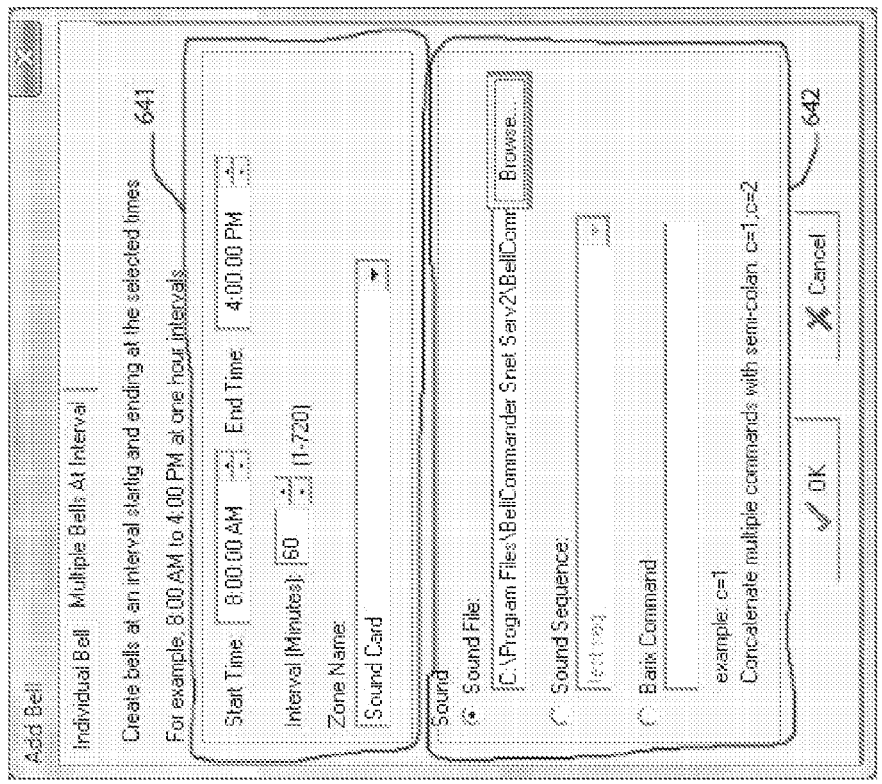

FIGS. 6A, 6B, and 6C show graphical representations of the add day schedule process of the present embodiment.

Figure 7:
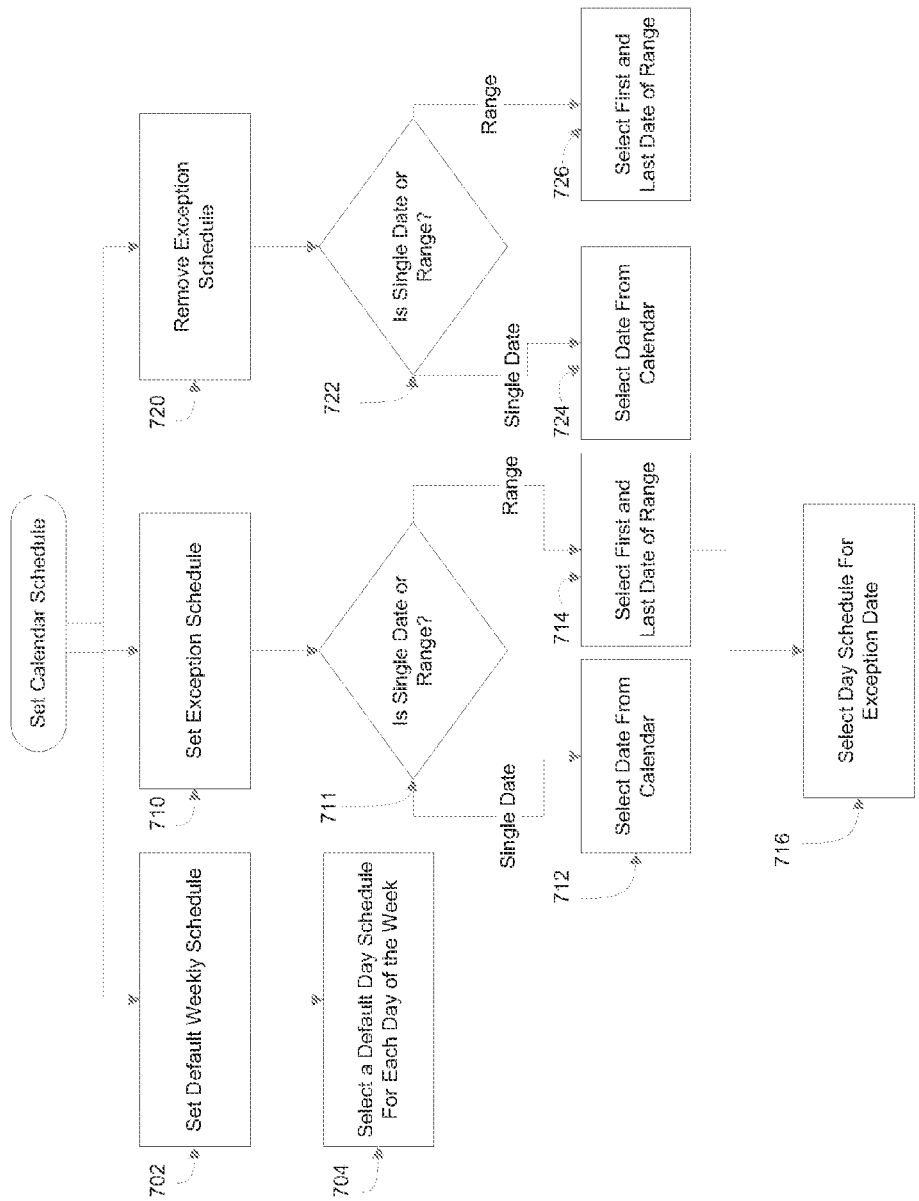

FIG. 7 shows a flow chart of the set calendar schedule process of the present embodiment.

FIGS. 7A, 7B, 7C, and 7D show graphical representations of the set calendar schedule process of the present embodiment.

Figure 8:
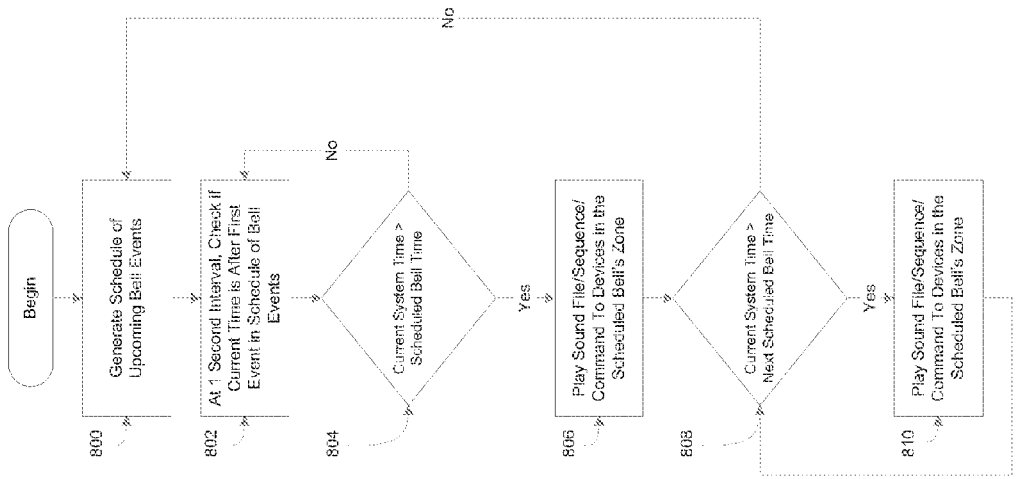

FIG. 8 shows a flow chart of the back-end scheduling processes of the present embodiment.

Figure 9:
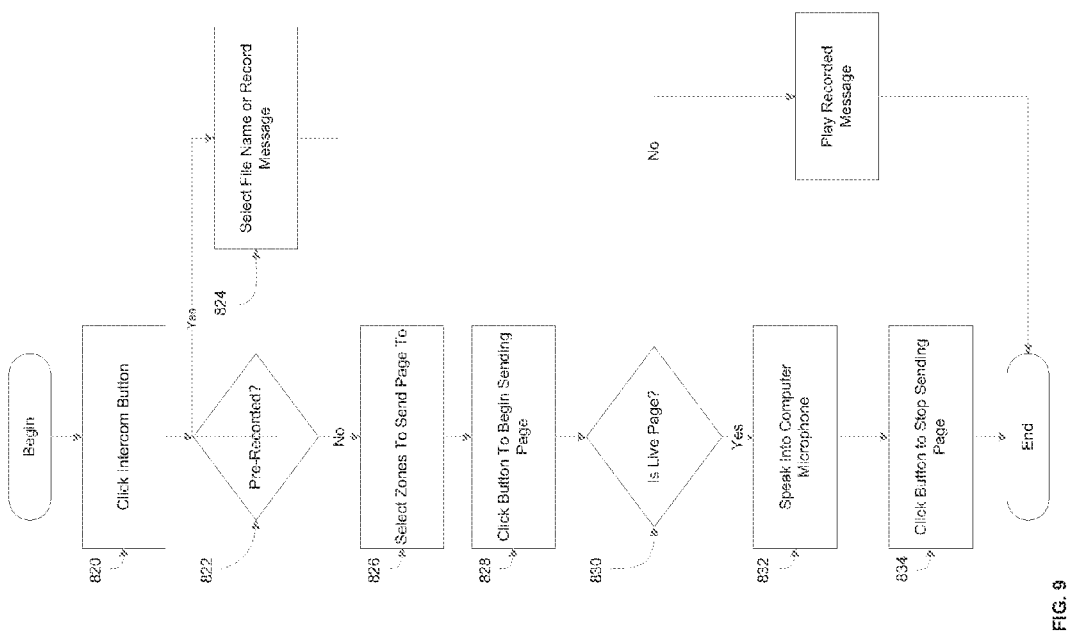

FIG. 9 shows a flow chart of the user process for sending a page of the present embodiment.

Figure 9A:
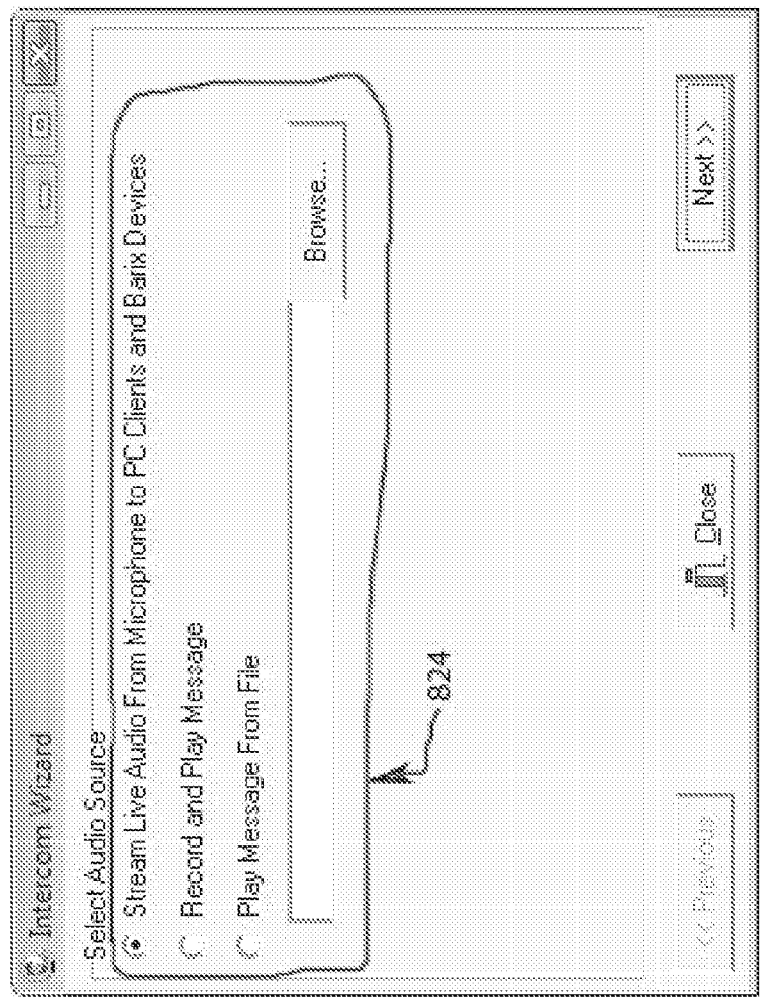
Figure 9B:
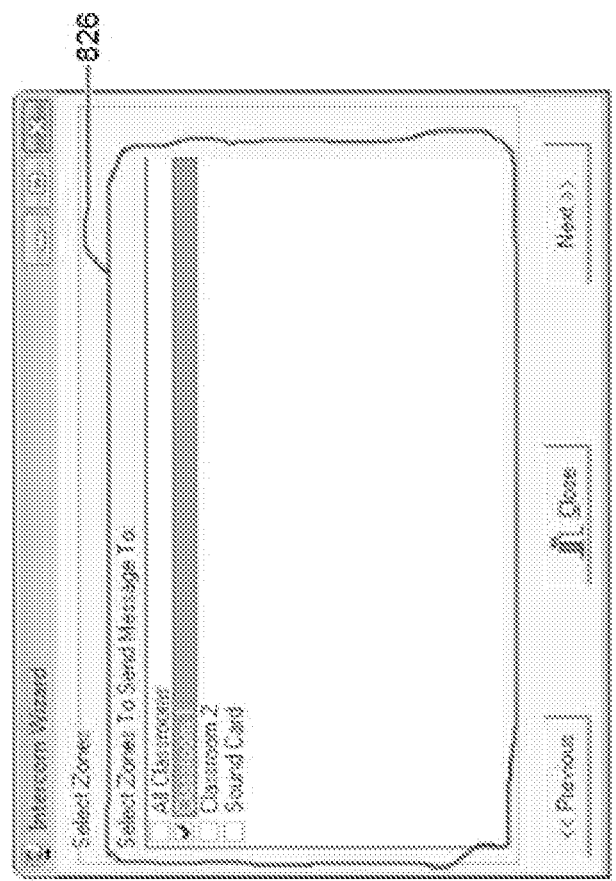

FIGS. 9A, 9B, and 9C show graphical representations of the user process for sending a page.

Figure 10:
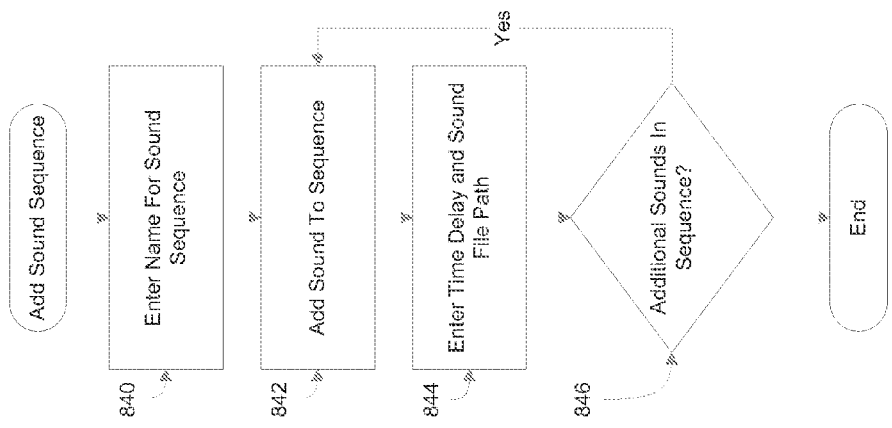

FIG. 10 shows a flow chart of the user process for creating sound sequences of the present embodiment.

Figure 10A:
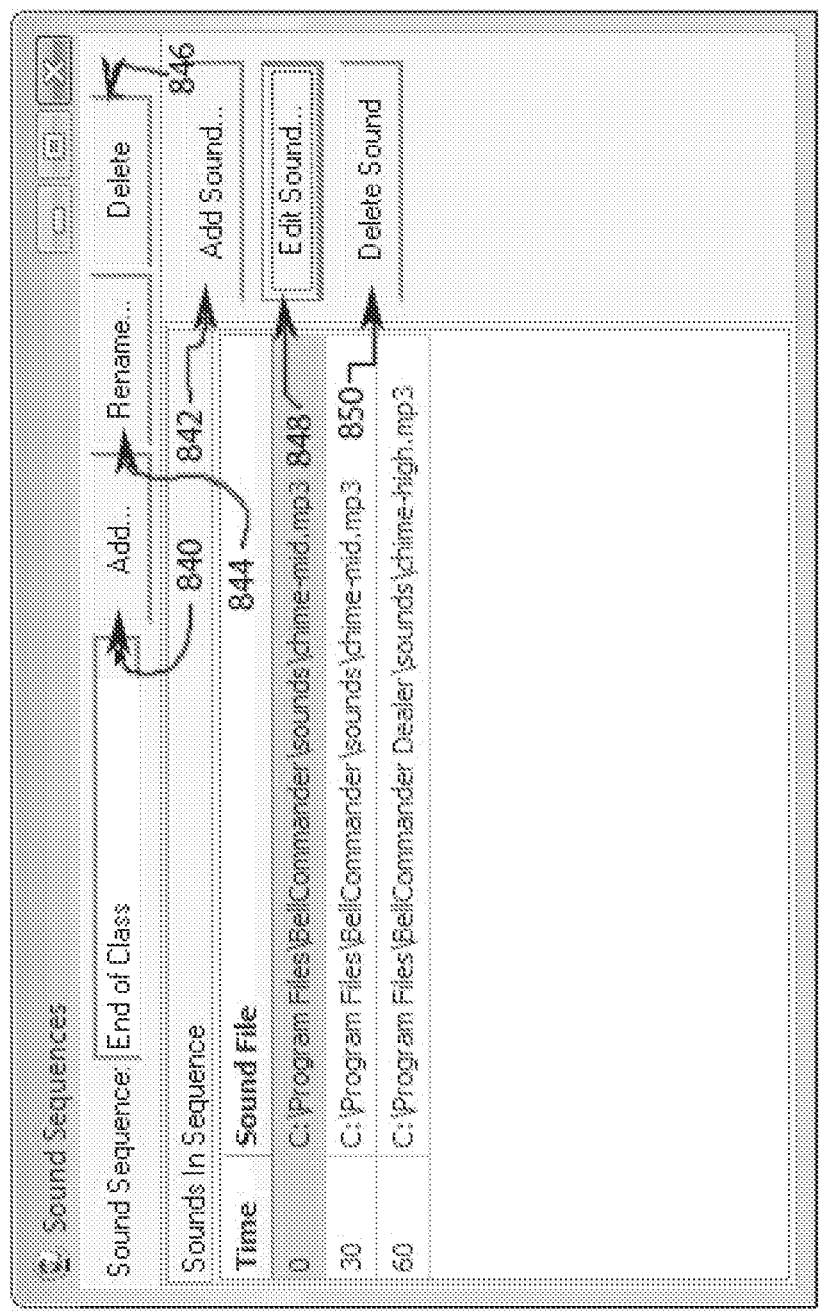
Figure 10B:
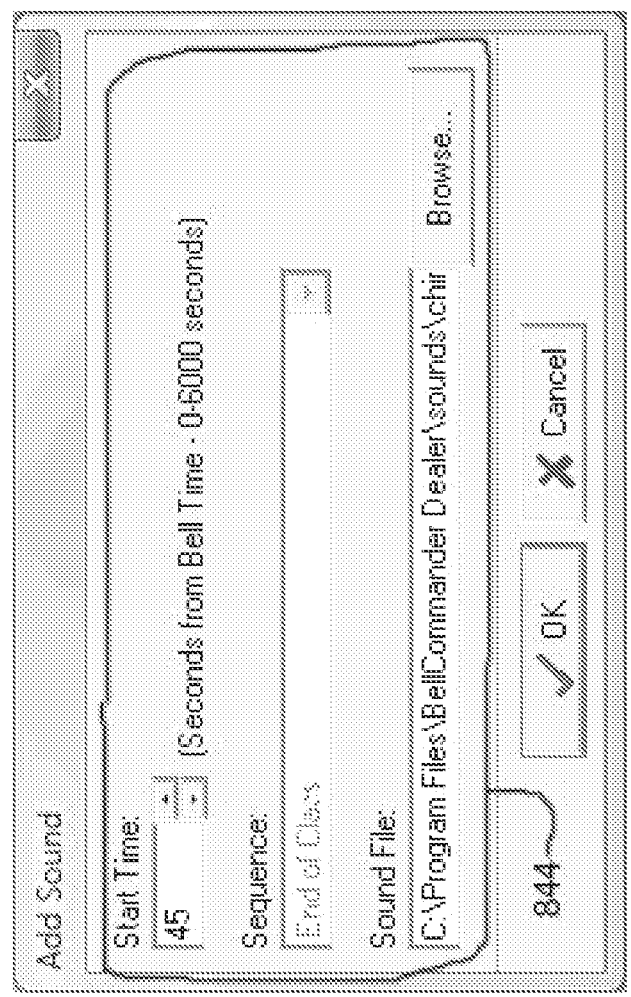

FIGS. 10A and 10B show a graphical representation of the user process for creating sound sequences of the present embodiment.

FIG. 11 is a schematic diagram of the physical components of an alternative embodiment of the present invention.

DETAILED DESCRIPTION OF ILLUSTRATIVE EMBODIMENTS

Although described with particular reference to TCP/IP networks, the claimed subject matter can be implemented in any standardized network architecture and/or protocol; as a way of example, and not limitation, the network architecture and/or protocol includes: AppleTalk™, TCP/IP, Novell™, Ethernet, LocalTalk™, TokenRing™, FDDI (Fiber Distributed Data Interface), ATM (Asynchronous Transfer Mode), LAN (Local Area Network), WAN (Wide Are Network), Internet, Intranet, etc. Furthermore, though referenced with particular emphasis as to personal computers, the disclosure is intended to include any controller device that can transmit and/or receive over a standardized network architecture and/or using a standard network protocol; as a way of example, and not limitation, cell phone, PDA (personal Digital Assistant), MDA (Mobile Digital Assistant), internet appliance, etc. Additionally, though described with reference to "wired" type networks, the disclosure is intended to also include wireless networks. Furthermore, bell as used herein is intended to include any sound; as a way of example, and not limitation, chime, buzz, voice, siren, bong, boom, clang, jingle, tinkle, alarm, ringer, and dinger.

Those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

A technical advantage of the present invention is its use of standard TCP/IP network architecture and a PC driven management system. Standard TCP/IP network architecture and a PC driven management system dramatically lower the total cost of the system. Systems that rely on proprietary networks and controllers have a much higher cost than standardized components. Proprietary networks also require dedicated cabling; however, through the use of standardized networks, the invention can easily be expanded to locations with an existing standardized network.

Another technical advantage of the present invention is that programming the bell schedule is much simpler than known systems. Known systems involve programming electronic timer devices, while the invention uses an easy-to-use graphical user interface ("GUI") driven computer application. Programming electronic timers requires much more technical expertise than programming the GUI-driven computer application.

An additional technical advantage of the present invention is that any audio can be played, including sounds and music. Known systems are limited to playing only a single audio sound, such as a chime or bell. The invention can play multiple chime and bell sounds as well as other sound effects and music.

Yet another technical advantage of the present invention is that audio can easily be synchronized across the system. Known systems lose synchronization of audio between buildings and sites. When synchronization is lost, audio that is scheduled to play at the same time in different locations will play at different times in each location. The present invention controls all audio from the Controller PC. All devices, regardless of physical location, receive audio from the Controller PC over the network at the same time. The Controller PC's internal clock can be synchronized to an Internet Time Server or domain controller for precise timing.

Figure 1:
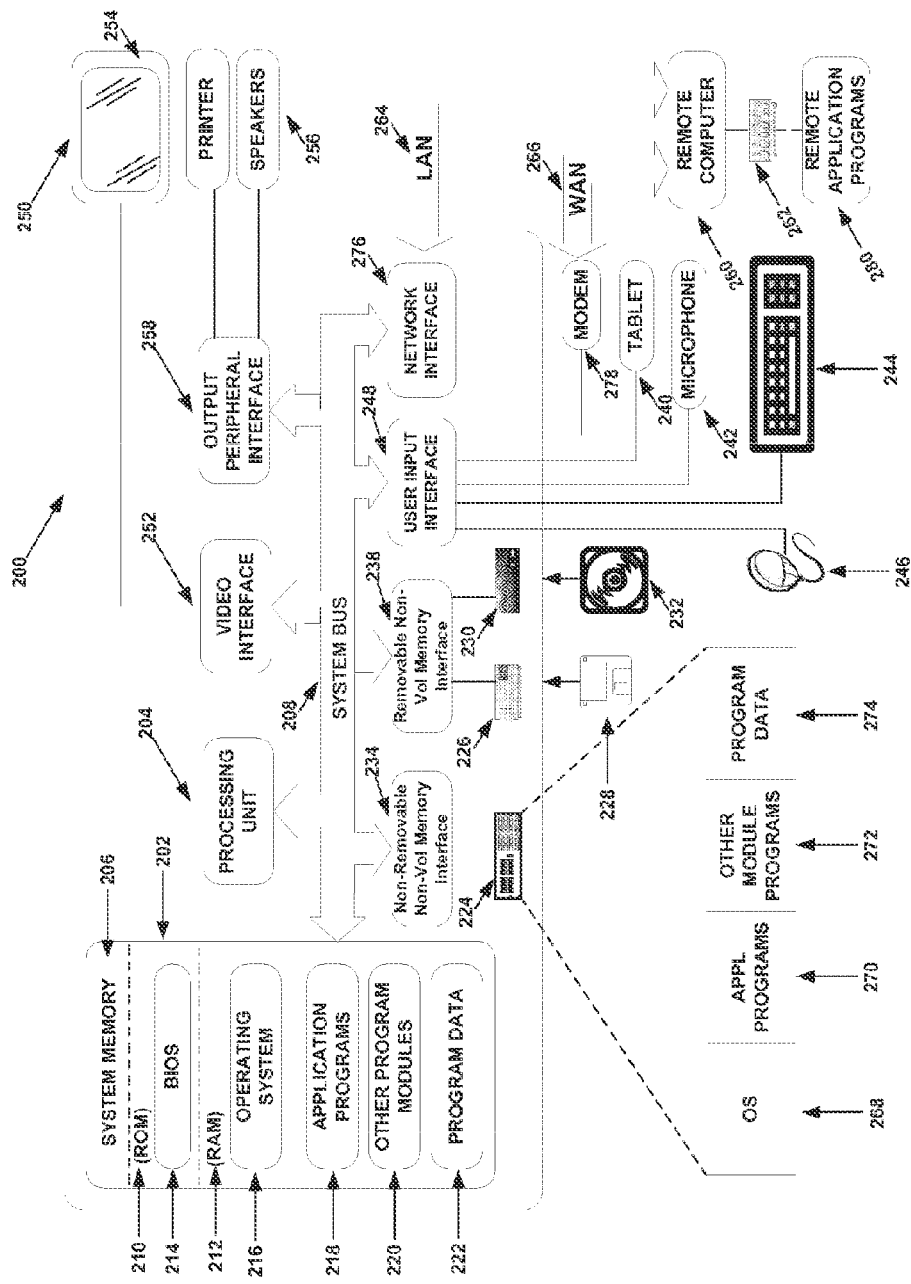
FIG. 1 illustrates a computer system and related peripherals that may operate with the bell/intercom system of the present embodiment.

With reference to FIG. 1, an exemplary system within a computing environment for implementing the invention includes a general purpose computing device in the form of a computing system 200, commercially available from Intel, IBM, AMD, Motorola, Cyrix and others. Components of the computing system 202 may include, but are not limited to, a processing unit 204, a system memory 206, and a system bus 236 that couples various system components including the system memory to the processing unit 204. The system bus 236 may be any of several types of bus structures including a memory bus or memory controller, a peripheral bus, and a local bus using any of a variety of bus architectures.

Computing system 200 typically includes a variety of computer readable media. Computer readable media can be any available media that can be accessed by the computing system 200 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 200.

The system memory 206 includes computer storage media in the form of volatile and/or nonvolatile memory such as read only memory (ROM) 210 and random access memory (RAM) 212. A basic input/output system 214 (BIOS), containing the basic routines that help to transfer information between elements within computing system 200, such as during start-up, is typically stored in ROM 210. RAM 212 typically contains data and/or program modules that are immediately accessible to and/or presently being operated on by processing unit 204. By way of example, and not limitation, an operating system 216, application programs 220, other program modules 220 and program data 222 are shown.

Computing system 200 may also include other removable/non-removable, volatile/nonvolatile computer storage media. By way of example only, a hard disk drive 224 that reads from or writes to non-removable, nonvolatile magnetic media, a magnetic disk drive 226 that reads from or writes to a removable, nonvolatile magnetic disk 228, and an optical disk drive 230 that reads from or writes to a removable, nonvolatile optical disk 232 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 224 is typically connected to the system bus 236 through a non-removable memory interface such as interface 234, and magnetic disk drive 226 and optical disk drive 230 are typically connected to the system bus 236 by a removable memory interface, such as interface 238.

The drives and their associated computer storage media, discussed above, provide storage of computer readable instructions, data structures, program modules and other data for the computing system 200. For example, hard disk drive 224 is illustrated as storing operating system 268, application programs 270, other program modules 272 and program data 274. Note that these components can either be the same as or different from operating system 216, application programs 220, other program modules 220, and program data 222. Operating system 268, application programs 270, other program modules 272, and program data 274 are given different numbers hereto illustrates that, at a minimum, they are different copies.

A user may enter commands and information into the computing system 200 through input devices such as a tablet, or electronic digitizer, 240, a microphone 242, a keyboard 244, and pointing device 246, commonly referred to as a mouse, trackball, or touch pad. These and other input devices are often connected to the processing unit 204 through a user input interface 248 that is coupled to the system bus 208, but may be connected by other interface and bus structures, such as a parallel port, game port or a universal serial bus (USB).

A monitor 250 or other type of display device is also connected to the system bus 208 via an interface, such as a video interface 252. The monitor 250 may also be integrated with a touch-screen panel or the like. Note that the monitor and/or touch screen panel can be physically coupled to a housing in which the computing system 200 is incorporated, such as in a tablet-type personal computer. In addition, computers such as the computing system 200 may also include other peripheral output devices such as speakers 254 and printer 256, which may be connected through an output peripheral interface 258 or the like.

Computing system 200 may operate in a networked environment using logical connections to one or more remote computers, such as a remote computing system 260. The remote computing system 260 may be a personal computer, a server, a router, a network PC, a peer device or other common network node, and typically includes many or all of the elements described above relative to the computing system 200, although only a memory storage device 262 has been illustrated. The logical connections depicted include a local area network (LAN) 264 connecting through network interface 276 and a wide area network (WAN) 266 connecting via modem 278, but may also include other networks. Such networking environments are commonplace in offices, enterprise-wide computer networks, intranets and the Internet.

For example, in the present embodiment, the computer system 200 may comprise the source machine from which data is being migrated, and the remote computing system 260 may comprise the destination machine. Note however that source and destination machines need not be connected by a network or any other means, but instead, data may be migrated via any media capable of being written by the source platform and read by the destination platform or platforms.

The central processor operating pursuant to operating system software such as IBM OS/2®, Linux®, UNIX®, Microsoft Windows®, Apple Mac OSX® and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

Figure 2:
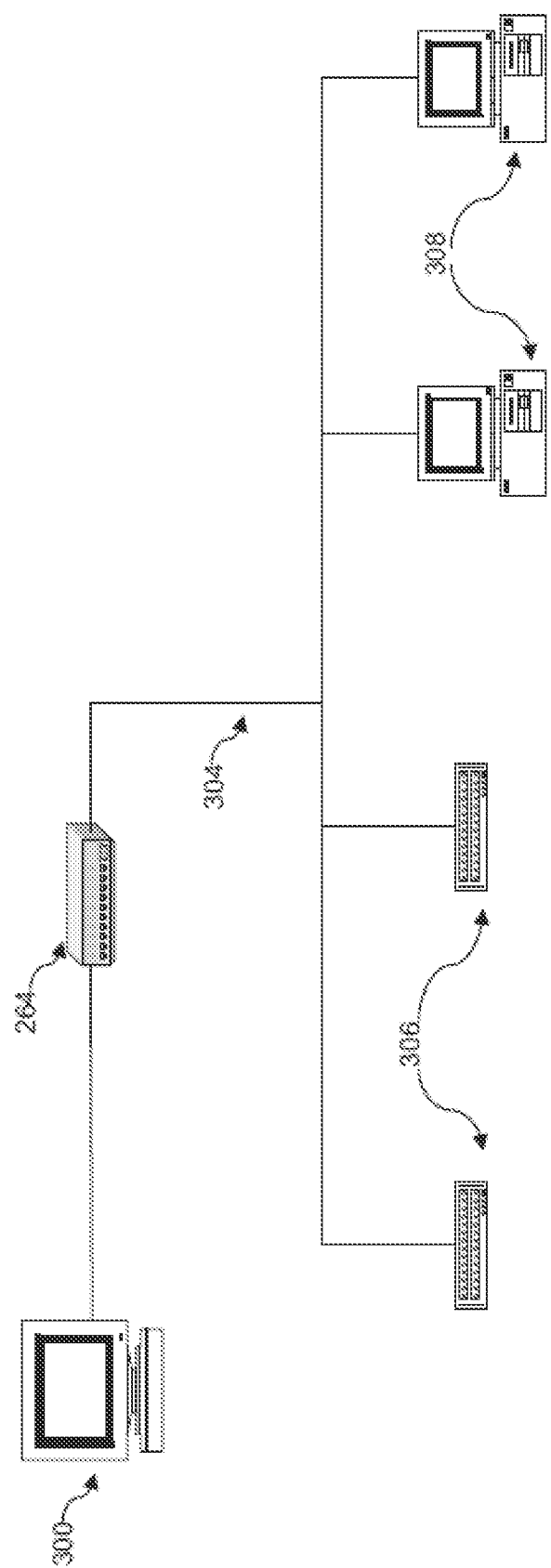
FIG. 2 is a schematic diagram of the physical components of the present invention.

FIG. 2 is a schematic diagram of an embodiment of the present invention. A Controller PC 300, which may be a computing system 200 as described in FIG. 1, is connected to a LAN 264 or WAN (266, FIG. 1). In the present embodiment, the LAN 264, is a TCP/IP network. The Controller PC 300 has a software application installed that allows a user to manage the system. The LAN 264 may include routers, switches, hubs, etc., and cables 304 are used for communication from the Controller PC 300 to network audio devices 306 and client PCs 308, which may be computing systems 200 as described in FIG. 1. Network audio devices 306 are devices that connect to a network and decode audio data and output audio through audio output jacks or internal speakers. The Client PCs 308 may have a client application installed to receive audio data from the Controller PC 300. The client application decodes the audio data and plays the audio through the sound card of the client PC 308.

FIGS. 3 and 3A, respectively, show a flow chart and a graphical representation of the top-level user interface for creating a multiple zone bell schedule of the present embodiment. For reference, each step in FIG. 3 has a corresponding detailed diagram in FIG. 4 through FIG. 7. As illustrated in FIG. 3, a user has the following options: add network audio devices 310, create zones 312, add sound sequences 314, create day schedule 316, assign day schedules to the calendar 318, and intercom 320.

FIG. 4 shows a flow chart of the add network audio devices 310 option of the present embodiment. The user first selects the type of audio device to add 402 which, in the preferred embodiment, is presented as a drop-down menu populated with a list of devices that the software recognizes which may include: network audio devices (306, FIG. 2) such as devices manufactured by Barix and CD30, and/or client PCs (308, FIG. 2), and/or network relay controller(s) (not shown). A network relay controller is similar to a switch that could be used to turn an associated device on, off, or perform a particular function. The user then may enable communication to the specified device 404. The network audio devices (306, FIG. 2) and client PCs (308, FIG. 2) are either added manually or automatically depending on the selected device type. In one embodiment, the client PCs (308, FIG. 2) (not shown) are detected automatically by the software 408. If the device is of a type that is manually added, then the user will indicate he or she desires to add a device 410 and enters the name and IP address or host name of the device 412. If the user desires to add additional network audio devices 414, the user repeats steps 410 through 414.

FIGS. 4A and 4B show graphical representations of the add network audio devices (310, FIG. 4) option of the present embodiment. In FIG. 4A, the user selects the device type 402, enables communication to the device type 404, and manually adds devices 410. When manually adding devices, the user interface in FIG. 4B is displayed. In FIG. 4B, the user may enter a name for the device and the IP address or hostname of the device 412. Referring back to FIG. 4A, after adding a device, the user may edit the device's IP address 420 or remove the device 430. The user may also enter settings specific to the device, such as the communication protocol (TCP or UDP) and port numbers 440. Finally, the user may also test the device by selecting an audio file and sending the audio file to the device 450.

FIG. 5 shows a flow chart of the add zone (312, FIG. 3) option of the present embodiment. Zones allow devices to be grouped logically and may consist of any number of audio devices (306, FIG. 2) and/or client PCs (308, FIG. 2). In one embodiment, a user may target bell events and pages to one or more zones. The user enters a name to identify the zone by 502. The name can be any alphanumeric string that is not already used for another zone. The user would then assign devices to the zone. Finally, the user would select which device(s) should be added to the zone 506.

FIGS. 5A and 5B show graphical representations of the add zone option of the present embodiment. In FIG. 5A, the user has the option to add zones 501, delete a zone 508, rename a zone 510, or edit the device list 505. FIG. 5B is displayed to the user after the user elects to edit the device list (505, FIG. 5A). FIG. 5B shows a multi-windowed GUI where one side displays the devices that are available to be assigned 507 and the other side displays devices currently assigned to the zone 506.

FIG. 6 shows a flow chart of the add a day schedule process of the present embodiment. Each day schedule defines the audio event schedule for all zones for a single day. A day schedule would be created for the standard schedule of the organization and additional day schedules would be defined for each schedule that varies from the first day schedule. For example, a school would typically a standard schedule and an early dismissal schedule. An additional example would be a different schedule for Monday-Wednesday-Friday classes and Tuesday-Thursday classes. The user would enter a name for the schedule 362. The name identifies the schedule and can be any alphanumeric name that is not already used for a day schedule. Next, the user would add a bell event to the day schedule 604. Next, the user would select the zone to send audio to, the time of the bell event, and the action to perform 606. The action could be playing a single sound file, playing a sequence of sound files, or sending a command. The user is then given the option of adding additional bells to the schedule 608. If the user chooses to add additional bells, the user repeats step 606. If the user chooses not to add additional bells, the user is given the option of adding additional day schedules 610. If the user chooses to add additional day schedules, the user repeats steps 602 through 610. If the user chooses to not add additional day schedules, the add a day schedule process is complete.

FIGS. 6A, 6B, and 6C show graphical representations of the add day schedule process of the present embodiment. In FIG. 6A, the user may add an additional day schedule 601, rename an existing day schedule 620, delete an existing day schedule 622, or copy an existing day schedule to a new day schedule 624. The copy to new schedule 624 option creates a new day schedule with a different name and all of the bell events of the original schedule, which is helpful when a user desires to make a new day schedule with only minor modifications from an existing day schedule. This allows the user not to have to re-enter all the day schedule information, but only the new or changed information. Also, the user may add a bell 604, edit a bell 626, delete a bell 628, or print the day schedule 630. Referring to FIG. 6B, when adding a bell (604, FIG. 6A), the user would enter the bell time, zone, and sound file for each bell 606. Finally, referring to FIG. 6C, the user may add several bells at specific intervals. The user would select a zone and the start and end times with an interval between each bell 641. The user would also select a sound file, sequence, or command the user desired to have executed at the prescribed interval 642. The bells would then be added at the interval starting at the start time and ending at the end time. For example, a user could add a bell every hour from 10 AM to 2 PM which would cause the bell to be added at 10, 11, 12, 1, and 2. Finally, the user may copy the day schedule to a zone (632, FIG. 6A), which copies the bell events for one zone to another zone for the same day.

FIG. 7 shows a flow chart of the set calendar schedule process of the present embodiment. The calendar is a graphical representation of a calendar system, such as the Gregorian calendar. The user can view the bell event schedule graphically by using the calendar. The user can also assign day schedules to each day on the calendar. The user has the option of: setting a default weekly schedule 702, setting an exception schedule 710, or removing an exception schedule 720. The default weekly schedule consists of the default schedule for each day of the week. To set the default schedule 702, the user selects a day schedule for each day of the week 704. In the preferred embodiment, the user would select the default schedule using a drop-down list which is populated with all available day schedules. After assigning the default weekly schedule, the user may define exceptions for any calendar day that differs from the default weekly schedule by using the set exception schedule option 710. The user would first select whether to add a single day exception schedule or an exception schedule for a range of days 711. If the user elected for only a single day exception, the user would select a date on the calendar where the schedule will differ from the default weekly schedule 712. The user would then assign a day schedule for that day 716. Finally, the user could be given the opportunity to add additional exception day schedules. If the user chose to add additional exception day schedules, the user would repeat steps 710 through 716; otherwise, the set weekly schedule process would end. If the user elected to add an exception schedule to a range of days, the user would enter a start date and end date for the exception range 714 and select a day schedule 716. All days in the range would receive the selected day schedule as an exception. Again, the user could be given the option of adding additional exception schedules.

To remove an exception schedule 720 the user would indicate whether the exception was for a single date or range of dates 722. If the exception was for a single day, the user would select the date from the calendar 724. If the exception is for a range of dates, the user would enter the start and end date of the date range for which the user intended to have exception schedules removed. Regardless of whether a single date 724 or range of dates 726 was selected, the corresponding schedule(s) would be removed.

Figure 7A:
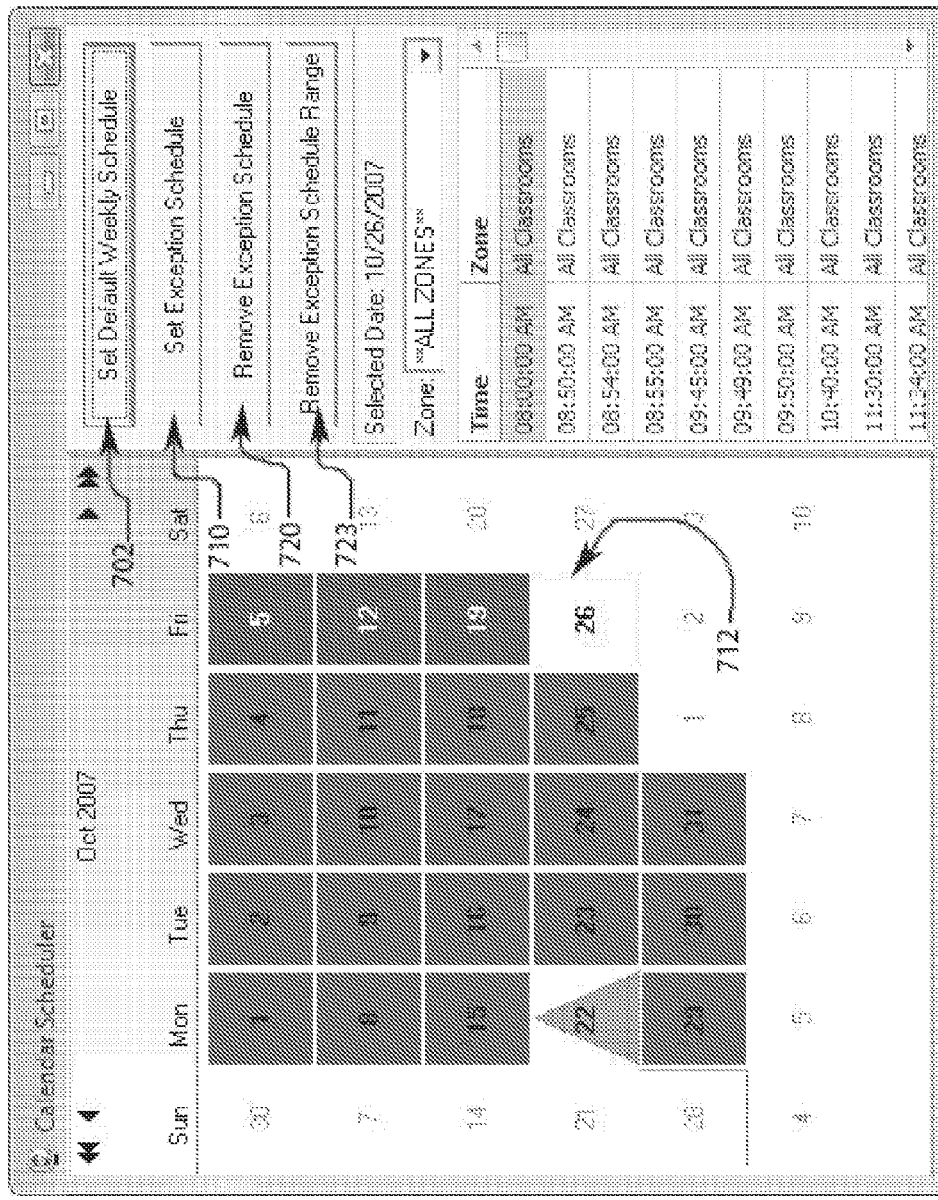
Figure 7B:
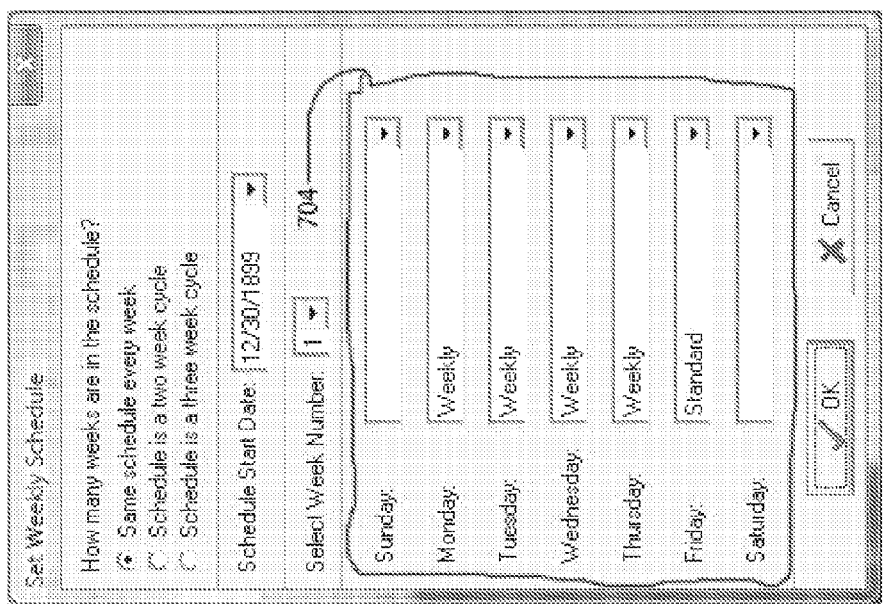
Figure 7C:
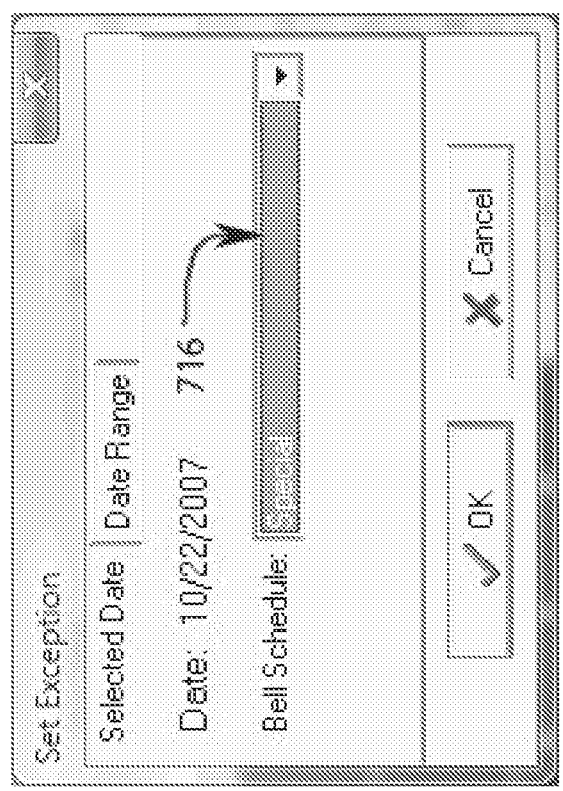
Figure 7D:
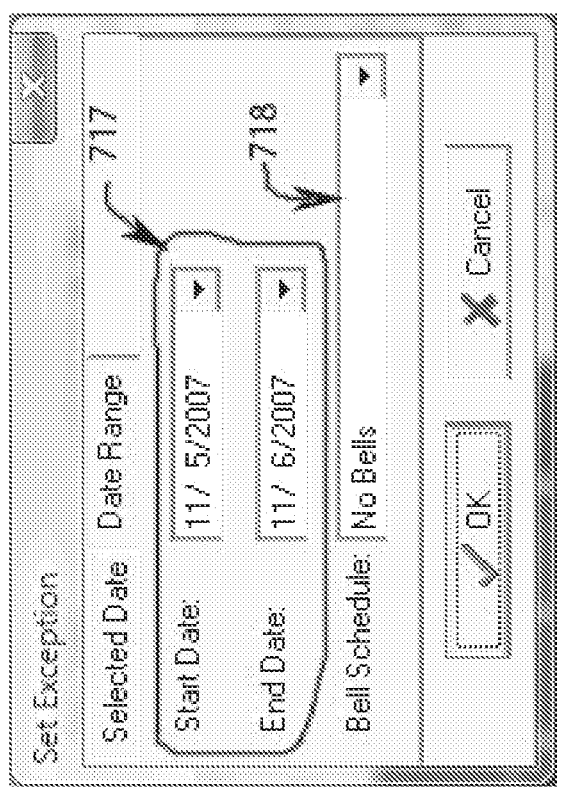

FIGS. 7A, 7B, 7C, and 7D show graphical representations of the set calendar schedule process of the present embodiment. In FIG. 7A, the main calendar scheduler functions can be accessed, including: setting the default weekly schedule 702, setting an exception schedule 710, removing an exception schedule 720, and removing an exception schedule range 723. FIG. 7B shows a graphical representation where the default weekly schedule may be set 704. In the preferred embodiment, each weekday would have a drop down box populated with the existing day schedules. FIG. 7C shows a user interface where the exception bell schedule may be selected 716 for either a particular date or a range of dates. Finally, FIG. 7D shows a window where either a single date or a range of exceptions can be removed by selecting the start and end dates of the exception 717 and selecting a corresponding bell schedule 718.

FIG. 8 shows a flow chart of the back-end scheduling processes of the present embodiment. The back-end scheduling process runs continuously in a loop after the first schedule is entered. The process starts with generating a list of upcoming bell events 800. This process creates a list of future bell events based on the time that the process is run. At one second intervals, the process determines whether the current time is the same or after the first bell event 802. If the current time is before the first bell event, the scheduler waits another second and compares the current time to the first bell event time. If the current time is the same or after the first bell's time, then the software plays the corresponding sound file, sequence, or command to the scheduled zone 806. The scheduler process then checks the next event in the bell event list 808. If the current time is before the next bell event's time, then the process restarts at 800. If the current time is the same or after the next bell event's time, then the software plays the next bell event's sound file, sequence, or command 810. The process continues to process each bell event in the bell list that has a time equal to or before the current time. Once a bell is reached that is after the current time, the process loops back to step 800.

FIG. 9 shows a flow chart of the user process for sending a page of the present embodiment. The user first indicates he or she would like to send a page 820. The user then decides whether to send a live or pre-recorded page 822. For a pre-recorded page, the user either selects an existing sound file or records a message using a microphone attached to the PC 824. A live page is a real-time page, which, in the preferred embodiment, would come from a microphone attached to the Controller PC (300, FIG. 2). Next, the user selects which zones to send the page to 826. The user may select one or multiple zones. The user then indicates he or she is ready to begin sending the page 828. If the page is a pre-recorded page, the software will play the pre-recorded sound file to the zone(s) selected. If the page is a live page, the user speaks into a microphone 832. The Controller PC software will send the live page in real-time to network audio devices (306, FIG. 2) and PC clients (308, FIG. 2). Once the user is finished delivering the live page, the user indicates he or she is finished. In the preferred embodiment, the user would click a "Stop" button to stop sending audio 834.

FIGS. 9A, 9B, and 9C show graphical representations of the user process for sending a page. In FIG. 9A, the user selects whether to send a live page, an audio file, or a pre-recorded page 824. In FIG. 9B, the user selects the zones to send the page to 826. In FIG. 9C, the user clicks buttons to play audio 828 and to stop playing on audio 834.

FIG. 10 shows a flow chart of the user process for creating sound sequences of the present embodiment. A sound sequence is a sequence of sound files which may include timing information (ex: time between sounds) and order information (ex: in what order to play multiple sounds). For example, a sound sequence may have a sound file that plays immediately, then a sound file that plays after a 30 second delay from the start of the event. Sound sequences are used in the day scheduler to play multiple sounds in sequence at a scheduled time, rather than playing a single audio bell. For example, a sound sequence could be used to play a warning school bell and then a tardy school bell one minute later. First, the user enters the name of the sound sequence 840. The name can be any alphanumeric string not already used as a sound sequence. The user then selects the sound to be played 842. In the preferred embodiment, the user could enter the path to the sound file or browse the file system to locate the sound file. Optionally, the user may also indicate a time delay to wait before playing the selected sound file 844. If the user desires to add additional sounds to the sound sequence 846, the user would repeat steps 842 and 844 until the user had added all his or her sound files.

FIGS. 10A and 10B show a graphical representation of the user process for creating sound sequences of the present embodiment. In FIG. 10A, a user may add a sound sequence 840, rename a sound sequence 844, or delete a sound sequence 846. Additionally, the user can add a sound to the selected sound sequence 842, edit a sound in a sound sequence 848, or delete a sound in a sound sequence 850. FIG. 10B shows a graphical representation of the add sound to a sound sequence process allowing the user to enter the start time, sequence, and location of the sound file 844.

In an additional embodiment pictured in FIG. 11, the LAN 264 or WAN (266, FIG. 1) may also contain IP phone systems 900 which relay audio to network audio devices 306. In this case, the Controller PC 300 would communicate through a LAN 264 or WAN (266, FIG. 1) to one or more IP phone systems 900. The Controller PC 300 would send instructions to the IP phone systems 900 to call or send audio data to one or more network audio devices 306 and the Controller PC 300 would send audio data to the IP phone systems 900. The IP phone systems 900 would then forward the audio data to the network audio devices 306. Although depicted as a single IP phone in the accompanying figure, it is intended to represent one or more IP phones, PBX (private branch exchange) systems, or other IP telephony devices. Furthermore, although described, for example, with network audio devices 306 directly connected to the IP phone system 900, there is no requirement that the IP phone system 900 be in direct connection to, for example, the network audio devices 306. Additionally, the IP phone system 900 could be located elsewhere on the LAN 264 or WAN 266.

The LAN 264 or WAN (266, FIG. 1) may also contain network audio routing devices 902 that would route audio data to network audio devices 306. In this case, the Controller PC 300 would communicate through a LAN 264 or WAN (266, FIG. 1) to one or more network audio routing devices 902. The Controller PC 300 would send instructions to the network audio routing devices 902 to send audio to one or more network audio devices. The network audio routing devices 902 would then forward the audio data to the network audio devices 306 either directly or through additional network audio routing devices 902. Although depicted as a single network audio routing device 902 in the accompanying figure, it is intended to represent one or more network audio routing devices 902. Furthermore, although described, for example, with network audio devices 306 directly connected to the network audio routing device 902, there is no requirement that the network audio routing device 902 be in direct connection to, for example, the network audio devices 306. Additionally, the network audio routing device 902 could be located elsewhere on the LAN 264 or WAN 266.

The Controller PC 300 as described in paragraph [0048] may be a computing system 200. The computing system 200 may be a cloud computing system where the application logic is stored and processed on multiple servers as described in paragraph. The cloud computing system may be a private or public cloud computing system.

The software on the Controller PC 300 may include a web server which allows users from one or more remote computing systems 260 to manage the system through a web browser or client software.

The software on the Controller PC 300 may include an application server which allows remote computing systems 260 or servers within the computing system 200 to interface with the software.

The present invention has been described above with reference to one or more embodiments. However, those skilled in the art will recognize that changes and modifications may be made in these embodiments without departing from the scope of the present invention. The processing features and functions described herein can be implemented in various manners. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A managed audio bell and intercom system, the system comprising:
    a controller, said controller being communicably coupled with a network, wherein
    said network is an industry standardized local or wide area network;
    said network being communicably coupled with at least one zone, each of said zones having at least one audio device;
    said network additionally communicably coupled to at least one internet protocol phone system and/or at least one network audio routing device;
    said controller having logic to distribute, via said network and at least one of said internet protocol phone system or said network audio routing device, an automated action to said audio device according to at least one predefined schedule, said schedule associated with a calendar and including at least one event, said event including at least one time, at least one date or day, and at least one audio device and/or zone.

2. The system of claim 1, wherein at least one of said audio devices in said zone is a network audio device or a network relay controller.

3. The system of claim 2, wherein said logic has the additional ability to distribute a prerecorded or live sound from said controller to:
    said network audio routing device which relays said prerecorded or live sound to one or more audio devices or a network relay controller; or
    said internet protocol phone system which relays said prerecorded or live sound to one or more audio devices or a network relay controller.

4. The system of claim 3, wherein said system may be remotely administered via the Internet or through an application server.

5. The system of claim 3, wherein said action is a prerecorded or live sound, said prerecorded or live sound distributed from said controller to said audio device and/or zone associated with said event for playback by said audio device and/or said audio devices associated with said zone.

6. The system of claim 3, wherein said controller is implemented in a cloud computing environment.

7. The system of claim 3, wherein said prerecorded sound includes at least one duration, said duration the length of time for which said prerecorded sound is played by said audio device.

8. A method of using an audio bell and intercom system, the method comprising the steps of:
    accepting at least one predefined schedule, said schedule associated with a calendar having at least one event, said event having at least one automated action, at least one time, at least one date or day, and at least one audio device or zone;
    transmitting said action via a network when said time and day or date is reached, wherein said network is an industry standardized local or wide area network;
    receiving said action at at least one internet protocol phone system and/or at least one network audio routing device;
    transmitting said action from said internet protocol phone system and/or said network audio routing device to one or more audio devices each of said audio devices associated with one or more zones; and
    executing said action on said audio devices.

9. The method of claim 8, wherein at least two schedules are accepted.

10. The method of claim 8, wherein said action is distributing a prerecorded or live sound from said controller via said internet protocol phone system and/or said network audio routing device to said audio devices and/or zones associated with said event and wherein playback of said prerecorded or live sound occurs on said audio devices and/or said zones associated with said event.

11. The method of claim 10, additionally comprising accepting at least two schedules, wherein one of said schedules is a default schedule and one of said schedules is an exception schedule, said exception schedule additionally comprising days or dates that said exception schedule shall be used instead of said default schedule.

12. The method of claim 10, wherein at least one of said audio devices associated with said event is associated with disparate zones.

13. The method of claim 10, wherein said event associated with said prerecorded sound also includes at least one duration, said duration the length of time for which said prerecorded sound is played by said audio devices and/or said zones associated with said event.

14. The method of claim 10, wherein at least one of said audio devices in said zone is a network audio device or a network relay controller.

15. A non-transitory computer readable storage medium encoded with a program for using an audio bell and intercom system, the program comprising the steps of:
    accepting at least one predefined schedule, said schedule associated with a calendar and having at least one event, said event having at least one automated action, at least one time, at least one day or date, and at least one audio device or zone;
    transmitting said action via a network when said time and day or date is reached, wherein said network is an industry standardized local or wide area network;
    receiving said action at at least one internet protocol phone system and/or at least one network audio routing device;

transmitting said action from said internet protocol phone system and/or said network audio routing device to one or more audio devices each of said audio devices associated with one or more zones; and executing said action on said audio devices.

16. The computer readable storage medium of claim 15, wherein at least two schedules are accepted.

17. The computer readable storage medium of claim 15, wherein said action is distributing a prerecorded or live sound from said controller via said internet protocol phone system and/or said network audio routing device to said audio devices and/or zones associated with said event.

18. The computer readable storage medium of claim 17, wherein at least one of said audio devices associated with said event is associated with disparate zones.

19. The computer readable storage medium of claim 17, wherein said event with said prerecorded sound also includes a duration, said duration additionally transmitted to said audio device and/or zones and the step of executing said action comprises playing said prerecorded sound for said duration.

20. The computer readable storage medium of claim 17, wherein at least one of said audio devices in said zone is a network audio device or a network realty controller.

* * * * *